(12) United States Patent
Hay

(10) Patent No.: US 9,186,596 B2
(45) Date of Patent: Nov. 17, 2015

(54) METHOD AND APPARATUS FOR ODORANT REMOVAL

(75) Inventor: Peter Stewart Hay, Mandurah (AU)

(73) Assignee: Alcoa of Australia Limited, Booragoon (AU)

( * ) Notice: Subject to any disclaimer, the term of this patent is extended or adjusted under 35 U.S.C. 154(b) by 640 days.

(21) Appl. No.: 13/389,718

(22) PCT Filed: Aug. 10, 2010

(86) PCT No.: PCT/AU2010/001011
§ 371 (c)(1),
(2), (4) Date: Mar. 19, 2012

(87) PCT Pub. No.: WO2011/017744
PCT Pub. Date: Feb. 17, 2011

(65) Prior Publication Data
US 2012/0175240 A1    Jul. 12, 2012

(30) Foreign Application Priority Data
Aug. 10, 2009 (AU) .............................. 2009903722

(51) Int. Cl.
*B01D 1/22* (2006.01)
*B01D 19/00* (2006.01)
(Continued)

(52) U.S. Cl.
CPC *B01D 1/065* (2013.01); *B01D 1/22* (2013.01); *B01D 1/28* (2013.01); *B01D 1/30* (2013.01);
(Continued)

(58) Field of Classification Search
CPC ............ B01D 1/065; B01D 1/22; B01D 1/28; B01D 1/30; B01D 3/38; B01D 5/0027; B01D 5/0039; B01D 5/006; B01D 19/0015

USPC .......... 159/13.2, 49; 202/153; 203/10, 14, 39, 203/89, 95, 98; 95/153, 159, 162, 168, 169; 96/155, 202, 243, 267; 261/148, 152, 261/115

See application file for complete search history.

(56) References Cited

U.S. PATENT DOCUMENTS 3,175,962 A    3/1965  Holtslag
3,644,179 A *  2/1972  Knoer et al. .................. 530/205
(Continued)

FOREIGN PATENT DOCUMENTS

DE    4036345    5/1992
EP    0862935    9/1998
(Continued)

OTHER PUBLICATIONS

International Search Report dated Aug. 10, 2009 from PCT International Application No. PCT/AU2010/001011.
(Continued)

*Primary Examiner* — Renee E Robinson
*Assistant Examiner* — Jonathan Miller
(74) *Attorney, Agent, or Firm* — Greenberg Traurig, LLP

(57) ABSTRACT

Odorant from a process stream is removed by passing the stream (18) to a counter-current contacting device (12) for stripping odorants. The odorants passes from the contacting device (12) as contaminated steam (26) while the remaining process stream passes directly to a "tube side" of a falling film evaporator (14) and is heated producing steam that passes into the counter-current contacting device (12) to strip that process stream and produce the contaminated steam (26). This contaminated steam from the contacting device (12) passes through a vapor compression step (16) from which it is introduced into a "shell side" of the falling film evaporator (14) and in which it heats the process stream passing from the contacting device (12) into the evaporator (14). The contaminated steam that is not condensed in the falling film evaporator passes as a low flow vent gas (50) in which the odorants have been concentrated.

22 Claims, 2 Drawing Sheets

(51) Int. Cl.
*B01D 1/06* (2006.01)
*B01D 5/00* (2006.01)
*B01D 1/28* (2006.01)
*B01D 1/30* (2006.01)
*B01D 3/38* (2006.01)

(52) U.S. Cl.
CPC *B01D 3/38* (2013.01); *B01D 5/006* (2013.01); *B01D 5/0027* (2013.01); *B01D 5/0039* (2013.01); *B01D 19/0015* (2013.01)

(56) References Cited

U.S. PATENT DOCUMENTS

| | | | |
|---|---|---|---|
| 3,766,020 A * | 10/1973 | Sieder | 203/26 |
| 3,933,953 A | 1/1976 | Leva | |
| 4,374,705 A * | 2/1983 | Sawai et al. | 203/19 |
| 4,537,605 A | 8/1985 | Gouw | |
| 4,539,076 A * | 9/1985 | Swain | 202/154 |
| 4,599,143 A * | 7/1986 | Stage | 203/6 |
| 4,601,790 A * | 7/1986 | Stage | 203/6 |
| 5,221,439 A | 6/1993 | Li et al. | |
| 5,250,151 A | 10/1993 | Huercanos | |
| 5,772,850 A * | 6/1998 | Morris | 202/237 |
| 6,217,711 B1 | 4/2001 | Ryham et al. | |
| 8,603,301 B2 * | 12/2013 | Heins et al. | 203/7 |
| 8,628,604 B2 * | 1/2014 | Moll et al. | 95/257 |
| 8,815,049 B2 * | 8/2014 | Heins et al. | 159/13.3 |
| 2005/0161316 A1 | 7/2005 | Hubinger et al. | |
| 2005/0183832 A1 | 8/2005 | Owens | |

FOREIGN PATENT DOCUMENTS

| | | | |
|---|---|---|---|
| FR | 2583651 | 12/1986 | |
| FR | 2593718 | 8/1987 | |
| JP | 11076761 | 3/1999 | |
| JP | 11076761 A * | 3/1999 | B01D 53/86 |
| WO | 2009/053518 | 4/2009 | |

OTHER PUBLICATIONS

Supplementary European Search Report dated Jan. 24, 2014 from corresponding European application No. 10807782.

* cited by examiner

METHOD AND APPARATUS FOR ODORANT REMOVAL

CROSS REFERENCE TO RELATED APPLICATIONS

This application is a national phase filing under 35 U.S.C. 371 of International Application No. PCT/AU10/01011, filed on Aug. 10, 2010, which claims the benefit of Australian Application No. 2009903722 filed Aug. 10, 2009, the entirety of which is hereby incorporated herein by reference.

FIELD OF THE INVENTION

The present invention relates to a method and apparatus for odorant removal. More particularly, the method and apparatus of the present invention are intended for use in the removal or stripping of ammonia and other volatile organic compounds from condensate produced in the Bayer process for the production of alumina from bauxite.

BACKGROUND ART

Traditionally, odorants such as ammonia and other volatile organic compounds (VOCs) have been steam stripped from liquid process streams. However, the volume of steam that is subsequently produced is large.

A particular problem is presented by high flow and low odorant concentration process streams in that they are difficult to treat economically with existing techniques and technology. Further, the particular application of such technology in Bayer process plants for the production of alumina from bauxite presents complexities relating to the possibility of slurry carry-over from flash tanks. As such, any technique employed in the Bayer process must be able to cope with this possibility.

Previous efforts to remove odorants from process streams include the methods and apparatus' described in U.S. Pat. No. 6,217,711 and Japanese Publication 11076761. U.S. Pat. No. 6,217,711 describes a method for the regenerative heat recovery in high temperature condensate stripping plants, specifically for application in cellulose pulp mills. Foul condensate is heated as it passes to a steam stripping stage. From the steam stripping stage a vapour containing contaminants is passed to a re-boiler, from which the contaminants are passed to a known destructive step. A clean condensate is also produced from the steam stripping stage. The clean condensate is passed to a number of flash stations in series. These flash stations produce a flashed vapour that is utilised to heat foul condensate during its passage to the steam stripping stage. As can be noted, the foul condensate is exposed to only a single stripping stage. Further, the method utilises an arrangement or combination of discrete processes steps that is not conducive to size minimisation. That is, it would be difficult to fit into existing process plants where space is often very limited.

Japanese Publication 11076761 describes a process directed to the efficient recovery of thermal energy and in which an ammonia containing waste water is heated and passed to a steam stripping stage, in turn producing treated wastewater that is either used to heat the waste water (much as described in U.S. Pat. No. 6,217,711) or is passed to a re-boiler, the vapour from which is passed back to the steam stripping stage. Again, whilst the 're-boiling' of the 'clean' wastewater evaporates that cleaned wastewater, strictly only a single stripping stage is employed. A significant proportion of any contaminants remaining in the treated or 'clean' wastewater from the steam stripping stage are expected to condense and require further treatment. Further, the volume of the steam carrying the contaminants from the steam stripping stage is relatively large and leads to demands on the subsequent destructive processes employed and creating a 'heavy' recycling load on the plant.

These prior art processes are in many respects complicated due to the number of discrete process steps and mechanical items involved in the treatment process and which are required to provide a suitably low flow process stream for the eventual destruction of the removed odorants. Further, these processes are not considered robust enough to handle the carryover of slurries, such as Bayer process slurries, from the flashing steps that produce the process or condensate stream that is to be handled by the process.

One object of the method and apparatus of the present invention is to substantially overcome at least some of the problems associated with the prior art described hereinabove, or to at least provide a useful alternative thereto.

The preceding discussion of the background art is intended to facilitate an understanding of the present invention only. It should be appreciated that the discussion is not an acknowledgement or admission that any of the material referred to was part of the common general knowledge in Australia or any other country as at the priority date of the application.

Throughout this specification, unless the context requires otherwise, the word "comprise", or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a method for odorant removal from a process stream, the method characterised by the method steps of passing a contaminated process stream to a counter-current contacting device in which odorants are stripped from the process stream, the odorants being passed from the counter-current contacting device as contaminated steam whilst the remainder of the process stream passes directly to a 'tube side' of a falling film evaporator, in the falling film evaporator the remainder of the process stream is heated producing steam that passes into the counter-current contacting device to strip that process stream and produce the contaminated steam that passes from the counter-current contacting device, the contaminated steam from the counter-current contacting device is passed to a vapour recompression step from which it is introduced into a 'shell side' of the falling film evaporator and in which it heats the process stream passing from the counter-current contacting device into the falling film evaporator, the contaminated steam that is not condensed in the falling film evaporator being passed therefrom as a low flow vent gas in which the odorants have been concentrated.

Preferably, the process steam passed from the counter-current contacting device to the falling film evaporator is passed therefrom as the treated process stream. Still preferably, the contaminated steam that condenses in the falling film evaporator and which contains odorants is recombined with the process steam for reintroduction to the counter-current contacting device.

Still further preferably, the steam generated in the tube side of the falling film evaporator acts to further strip odorants from the remainder of the process stream 'falling' therein whilst passing through the counter-current contacting device.

In one form of the present invention the vent gas stream is passed to either thermal oxidation or catalytic conversion for the destruction of the odorants contained therein.

Preferably, the contaminated process stream is provided at a flow rate of between about 50 and 200 t/h. Still preferably, the contaminated process stream is provided at a flow rate of about 150 t/h.

The low flow vent gas preferably has a flow rate of between about 0.2 to 1 t/h. Still preferably, the low flow vent gas has a flow rate of about 0.5 t/h.

Preferably, the contaminant in the contaminated process stream is present at levels of between about 20 and 200 ppm. Still preferably, the contaminant in the contaminated process stream is present at levels of about 50 ppm and/or at least about 1.4 kg/h.

Preferably, the contaminant in the treated process stream is present at levels of between about 1 to 10 ppm. Still preferably, the contaminant in the treated process stream is present at a level of about 5 ppm or about 0.7 kg/h.

Still preferably, the combined contaminated process stream and condensed contaminated process stream from the falling film evaporator is provided at a flow rate of at least about 164.5 t/h and contains contaminant at the level of about 54 ppm.

Still further preferably, the combined contaminated process stream and condensed contaminated process stream from the falling film evaporator contains contaminant at the level of at least about 8.9 kg/h.

Yet still preferably, the condensed contaminated process stream from the falling film evaporator is in the range of about 5 to 15% of the contaminated process stream flow.

In accordance with the present invention there is further provided an apparatus for odorant removal characterised in that the apparatus comprises a counter-current contacting device, a falling film evaporator and a compressor wherein the counter-current contacting device and the falling film evaporator are arranged with respect to each other such that steam that may be generated in a tube side of the falling film evaporator can pass into the counter-current contacting device and liquid from the counter-current contacting device can flow into the tube side of the falling film evaporator, steam containing odorants stripped from liquid in the counter-current contacting device being able to pass therefrom to the compressor which is in turn in communication with the shell side of the falling film evaporator such that compressed steam containing odorants from the counter-current contacting device is able to heat the liquid process stream passing from the counter-current contacting device to the falling film evaporator, the falling film evaporator in turn having provided therein outlets for each of the treated process stream, condensed contaminated steam and a vent gas in which odorants have been concentrated.

Preferably, the contaminated steam that condenses in the falling film evaporator and which contains odorants is able to be recombined with the process stream by way of a recycle line for reintroduction to the counter-current contacting device.

Still preferably, the counter current contacting device has provided therein a base, in which is provided a liquid collector and distributor device that acts to collect condensate at the base and distribute it substantially uniformly to the tube side of the falling film evaporator. The base further preferably also facilitates the passage of flashed vapour from the tube side of the falling film evaporator into the counter current contacting device.

Still further preferably, the base is configured such that it is able to collect condensate at the base and distribute it substantially uniformly to the tube side of the falling film evaporator and facilitate the passage of flashed vapour from the tube side of the falling film evaporator into the counter current contacting device whilst managing the presence of solids content in the contaminated condensate.

BRIEF DESCRIPTION OF THE DRAWINGS

The method and apparatus of the present invention will now be described, by way of example only, with reference to one embodiment thereof and the accompanying drawings, in which:—

BEST MODE(S) FOR CARRYING OUT THE INVENTION

One embodiment of the invention will now be described, with particular application to the treatment of condensate streams such as may be produced by the action of the flashing of hot green Bayer process liquor and the subsequent use of the flash vapour in the heating of spent liquor.

Figure 1:
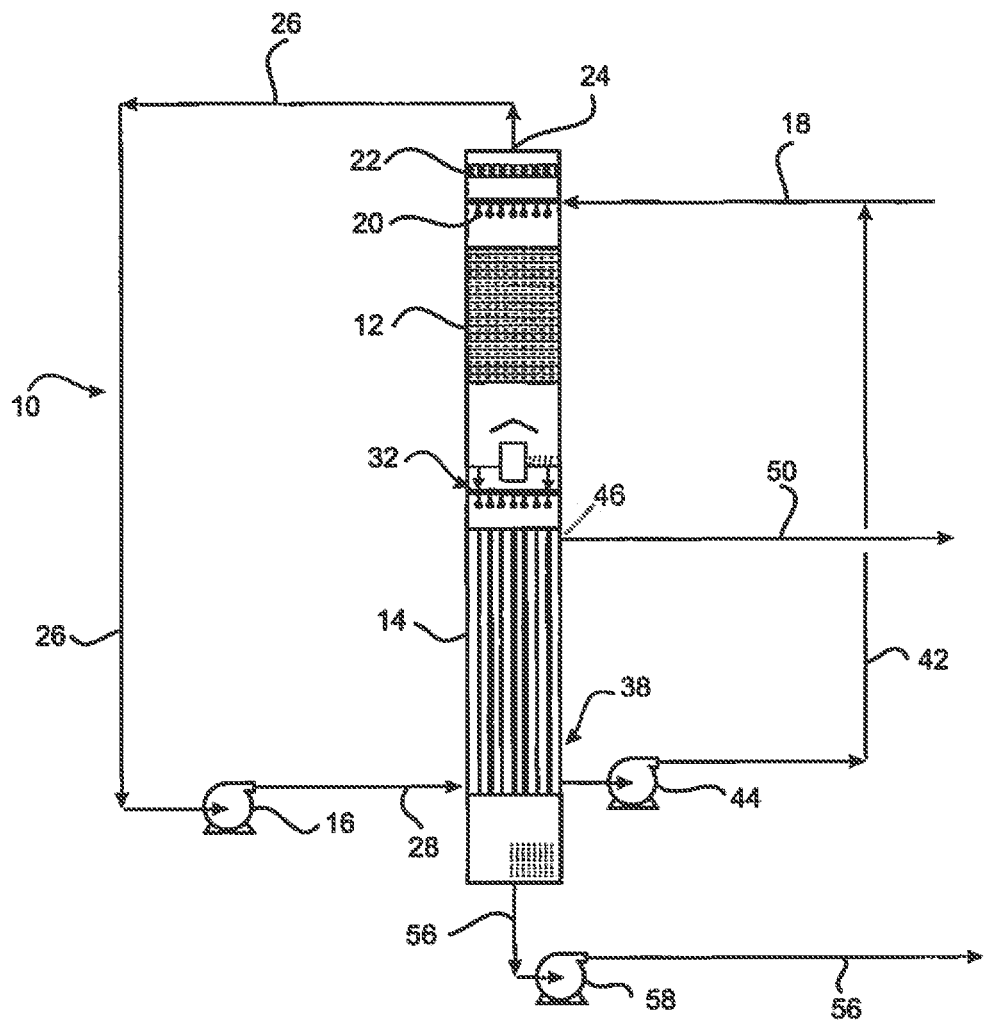
FIG. 1 is a schematic representation of a method and apparatus for odorant removal in accordance with the present invention.
Figures 2, 3:
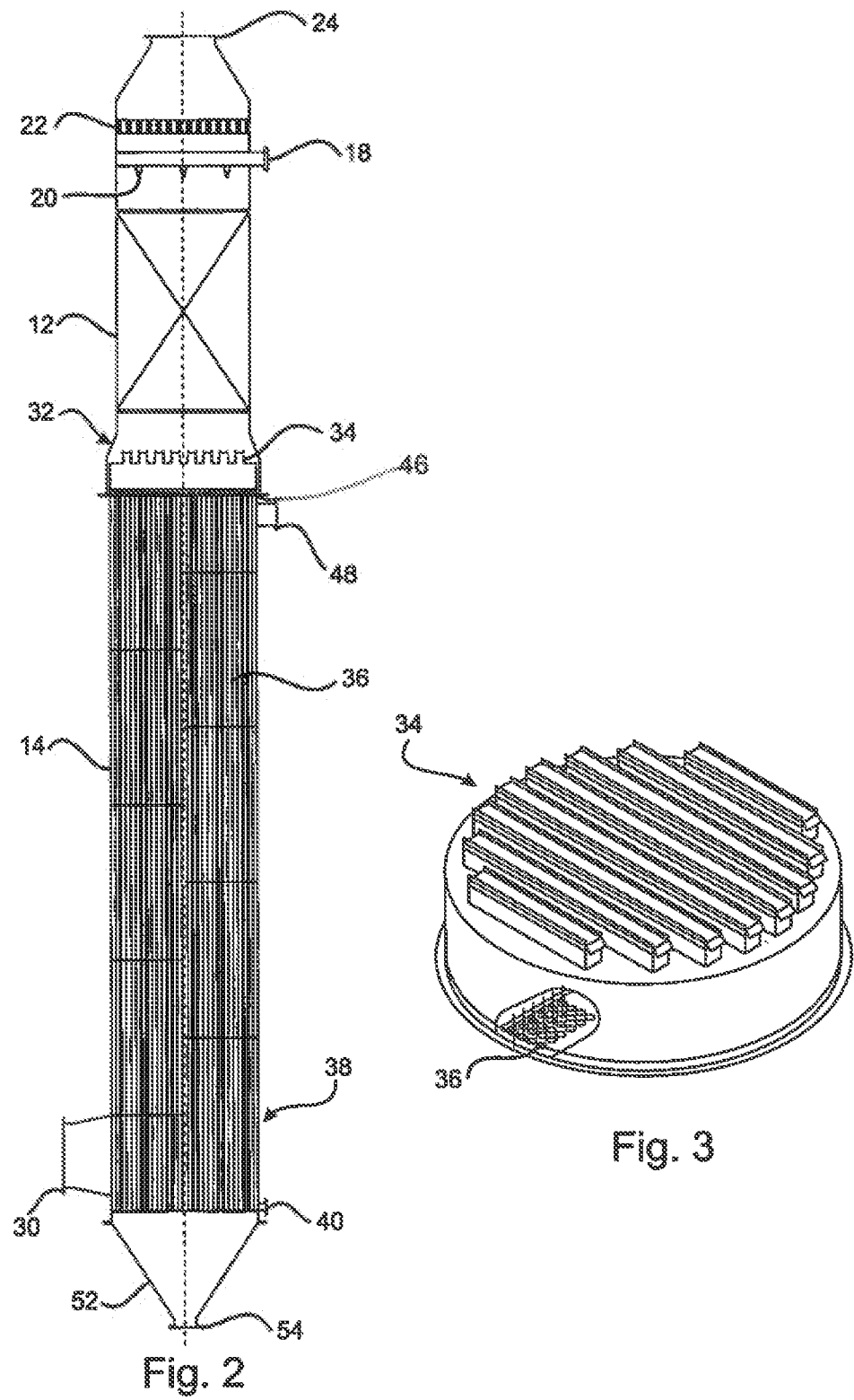
FIG. 2 is a sectional side-elevation view of a counter-current contacting device and falling film evaporator of the apparatus of the present invention in accordance with one embodiment thereof.
FIG. 3 is an upper perspective view of a liquid collector and distributor of the apparatus of FIG. 2.

In FIG. 1 there is shown an apparatus 10 for odorant removal, the apparatus 10 comprising a counter-current contacting device, for example a fluidised bed steam stripper 12, a falling film evaporator 14 having a single stage, and a compressor 16 for mechanical vapour recompression (MVR). The steam stripper 12 is fed with a contaminated condensate stream through a feed line 18. As shown in FIG. 2, the feed line 18 is provided with spiral nozzles 20 within the steam stripper 12 for distribution of the condensate stream therein, in generally known manner.

Towards an upper end of the steam stripper 12 there is provided a mist eliminator 22 and a vapour outlet 24. The vapour outlet 24 is in fluid communication with a recycle line 26 that passes to the compressor 16. A further recycle line 28 extends between the compressor 16 and a shell side inlet 30 of the falling film evaporator 14.

The steam stripper 12 has a base 32 in which is provided a liquid collector and distributor device 34, best seen in FIG. 3. The device 34 acts to collect condensate at the base 32 of the steam stripper 12 and distribute it substantially uniformly to the tube side of the falling film evaporator 14, in which it falls under gravity within a plurality of tubes 36 extending the length of the falling film evaporator, as seen in FIGS. 2 and 3. In addition to facilitating distribution of condensate to the tubes of the falling film evaporator 14, the device 34 is also arranged so as to manage the presence of solids in the condensate whilst also allowing passage upwards of flashed condensate from within the tubes 36 to the steam stripper 12.

The length of the tubes 36 of the falling film evaporator 14 are about 9 m, the number of the tubes about 600, the diameter of the tubes about 46.4 mm and the diameter of a shell thereof is about 1.8 m. These specific characteristics will vary depending upon the specific application of the method and apparatus of the invention. At a base 38 of the falling film evaporator 14 there is provided a recycle condensate outlet 40 with which the shell side of the falling film evaporator 14 communicates, as seen best in FIG. 2. The condensate outlet 40 passes to a condensate recycle line 42 in which is provided a pump 44. The recycle line 42 communicates with the feed line 18, as shown in FIG. 1.

The shell side of the falling film evaporator 14 has provided at or near an upper end 46 thereof a vent gas outlet 48, as shown in FIG. 2, that in turn communicates with a vent gas line 50, shown in FIG. 1.

The tube side of the falling film evaporator 14 has a collector 52 located below the base 38 and into which the tubes of the tube side drain, as shown in FIG. 2. The collector 52 in turn drains to a clean condensate outlet 54, in turn passing to a clean condensate line 56, in which is provided a pump 58, best seen in FIG. 1.

In use, with particular reference to the treatment of contaminated condensate from the continuous regenerative digesters of a bauxite refinery for the production of alumina, contaminated condensate at a rate of between about 50 and 200 t/h, for example 150 t/h, and temperature of 98.5° C. is passed through feed line 18 to the steam stripper 12. The contaminated condensate contains ammonia at levels of between about 20 to 200 ppm, for example about 50 ppm or 7.5 kg/h. Additional volatile organic compounds may or may not also be present. The contaminated condensate when passed into the steam stripper 12 is distributed therein through nozzles 20, at a pressure of about 91.0 kPa, in generally known manner for contact with flashed steam rising through the steam stripper 12. The steam stripper 12 operates, for example, with 4 stages, referring to the equilibrium state of the liquid and vapour phases therein, whereby the vapour and liquid phases leaving a stage are in thermal and chemical equilibrium.

Steam containing stripped contaminant then passes upwardly through the mist eliminator 22 to the vapour outlet 24. In turn, the contaminated steam passes through recycle line 26 to the compressor 16 at a rate of about 15 t/h, a temperature of about 97° C., a pressure of about 89.0 kPa and has an ammonia content of about 8.9 kg/h.

An external flow of steam (not shown) may be supplied to recycle line 26 when starting up the method of the present invention. This external flow of steam may also be used to control the temperature and pressure of the process during normal operation thereof.

From the compressor 16 compressed contaminant containing steam or vapour at about 133.6° C. and 116.1 kPa passes through recycle line 28 to the shell side inlet 30 of the falling film evaporator 14. The compressed contaminated steam enters the shell side of the falling film evaporator 14 and passes upwardly therethrough, during which process a portion will condense and flow downwardly such that it passes to the recycle condensate outlet 40 and in turn to the condensate recycle line 42 and further in turn to the feed line 18. This is due to the fact that the condensed contaminated steam from the shell side of the falling film evaporator 14 contains significant levels of ammonia and other volatile organic compounds. The conditions in the shell side of the falling film evaporator 14 are a temperature of about 103.3° C. and pressure of about 114 kPa. The log mean temperature difference (LMTD) being about 4.9° C.

The contaminated compressed vapour in the shell side of the falling film evaporator 14 that rises to the upper end 46 thereof passes from the falling film evaporator 14 through the vent gas outlet 48 and through the vent gas line 50, after which it is passed to a thermal oxidation or catalytic conversion step (not shown) for the destruction of the odorants or contaminants contained therein. The vent gas volume is relatively low at about 0.5 t/h but has an ammonia content of 6.8 kg/h.

The recycle condensate passed from the shell side of the falling film evaporator 14 to the feed line 18 contains about 94 ppm ammonia at 1.4 kg/h and is about 5 to 15% of the flow of the contaminated condensate in the feed line 18. The recycle stream is about 14.5 t/h at 103.3° C. This results in the total combined condensate feed to the steam stripper 12 being about 164.5 t/h, at 98.9° C., having 54 ppm ammonia at 8.9 kg/h. The pH of this combined condensate feed is preferably maintained at about 10 or greater (at 95.4° C.).

In the stream stripper 12 the contaminated condensate passes downwardly as odorants or contaminants are stripped therefrom by rising steam. Condensate in the steam stripper 12 passes downwardly to the base 32 at which point the liquid collector and distributed device 34 collects and distributes the at least partially stripped condensate and directs it to the tube side of the falling film evaporator 14. As such, the condensate passes into the tubes 36 and "falls" under gravity down at least part of the length of the falling film evaporator 14. The condensate flowing from the steam stripper 12 to the falling film evaporator 14 does so at about 164.3 t/h and about 98.3° C., comprising about 11 ppm ammonia at 1.8 kg/h.

Heat is exchanged between the compressed contaminated vapour in the shell side of the falling film evaporator 14 with the "falling" condensate in the tube side of the falling film evaporator 14. As the condensate is heated within the tube side a portion of this condensate is evaporated and passes upwardly through the tubes 36 during which passage it further strips the condensate "falling" in the tubes 36 before in turn passing upwardly into the steam stripper 12 where it performs the stripping action before passing through the recycled vapour outlet 24.

The vapour produced through the evaporation of the condensate within the tube side of the falling film evaporator 14 as it passes to the steam stripper 12 does so at a rate of about 14.8 t/h, a temperature of about 98.5° C., a pressure of 96.0 kPa and has an ammonia content of about 8.9 kg/h.

Accordingly, the condensate treated by the apparatus and method of the present invention undergoes two stages of stripping, one through the action of the evaporated condensate, or steam, within the falling film evaporator 14 and secondly through that steam's subsequent action in the steam stripper 12, as described hereinabove.

Condensate that is not evaporated within the tubes 36 of the tube side of the falling film evaporator 14 is collected in the collector 52 and flows to the clean condensate outlet 54, from which it is passed to the clean condensate line 56. The clean condensate has a flow rate of about 149.5 t/h at 98.5° C., containing between about 1 to 10 ppm ammonia, for example about 5 ppm ammonia, at a flow rate of 0.7 kg/h. As such, the process of the present invention is able to remove more than about 95% of ammonia present in the contaminated process stream.

As can be seen with reference to the above description, the method and apparatus of the present invention allow the removal of odorants from a process stream and the provision of a low flow but concentrated vent gas for further treatment. The provision of a low flow but concentrated vent gas for further treatment ensures that downstream treatment options are as economical as possible.

The method and apparatus of the present invention further provide what may be described as a self-contained system through the close coupling of the counter-current contacting device and falling film evaporator. In this manner the two stripping steps may be achieved and the apparatus can be provided at a relatively small size that allows its use in circumstances in which prior art arrangements would simply not be contemplated. The liquid collector and distributor device that acts to collect condensate at the base and distribute it substantially uniformly to the tube side of the falling film evaporator and which facilitates the passage of flashed vapour from the tube side of the falling film evaporator into the counter current contacting device also manages any solids content in the contaminated condensate.

It is envisaged that VOCs other than ammonia that may be removed from a process stream in accordance with the present invention may include acetone and acetaldehyde. It is further envisaged that greater than 98% of acetone and/or acetaldehyde that is present may be removed in accordance with the present invention.

Modifications and variations such as would be apparent to the skilled addressee are considered to fall within the scope of the present invention.

The invention claimed is:

1. A method, comprising:
passing a contaminated process stream comprising an odorant to a counter-current contacting device in which the odorant is stripped from the contaminated process stream through counter-current contact with a steam stream forming a stripped process stream and a contaminated steam comprising the odorant,
passing the stripped process stream directly to a tube side of a falling film evaporator,
producing the steam stream by heating the stripped process stream, whereby the steam stream passes into the counter-current contacting device to perform the stripping of the contaminated process stream,
passing the contaminated steam from the counter-current contacting device to a vapour recompression step,
introducing the contaminated steam into a shell side of the falling film evaporator, whereby the contaminated steam heats the stripped process stream to produce the steam stream,
passing the contaminated steam that is not condensed in the falling film evaporator to a vent gas outlet as a low flow vent gas in which the odorant is concentrated.

2. The method of claim 1, further comprising:
passing the process stream passed from the counter-current contacting device to the falling film evaporator as a treated process stream.

3. The method of claim 1, further comprising:
recombining the contaminated steam containing odorants that condenses in the falling film evaporator with the contaminated process stream for reintroduction to the counter-current contacting device.

4. The method of claim 1, further comprising:
stripping further odorants from the stripped process stream via the steam stream generated in the tube side of the falling film evaporator as the stripped process stream passes to the falling film evaporator and as the steam stream passes to the counter-current contacting device.

5. The method of claim 1, further comprising:
passing the low flow vent gas to either thermal oxidation or catalytic conversion for the destruction of the odorants contained therein.

6. The method of claim 1, further wherein:
passing the contaminated process stream is provided at a flow rate of between 50 to 200 t/h.

7. The method of claim 6, further comprising,
passing the contaminated process stream at a flow rate of 150 t/h.

8. The method of claim 1, further comprising:
passing the low flow vent gas at a flow rate of between 0.2 to 1.0 t/h.

9. The method of claim 8, further comprising:
passing the low flow vent gas at a flow rate of 0.5 t/h.

10. The method of claim 1, further wherein the odorant in the contaminated process stream is present at levels of between 20 to 200 ppm.

11. The method of claim 10, further wherein the odorant in the contaminated process stream is present at a level of 50 ppm.

12. The method of claim 1, further wherein the odorant in the contaminated process stream is present at levels of at least 1.4 kg/h.

13. The method of claim 2, further wherein the odorant in the treated process stream is present at levels of less than or equal to 5 ppm.

14. The method of claim 2, further wherein the odorant in the treated process stream is present at levels of less than or equal to 0.7 kg/h.

15. The method of claim 3, wherein the combined contaminated process stream and condensed contaminated process stream from the falling film evaporator is provided at a flow rate of 164.5 t/h.

16. The method of claim 3, wherein the combined contaminated process stream and condensed contaminated process stream from the falling film evaporator contains the odorant at the level of 54 ppm.

17. The method of claim 3, wherein the combined contaminated process stream and condensed contaminated process stream from the falling film evaporator contains the odorant at the level of 8.9 kg/h.

18. An apparatus comprising:
a counter-current contacting device comprising an inlet configured to receive a contaminated process stream;
a falling film evaporator comprising a tube side and a shell side; and
a compressor,
wherein the counter-current contacting device and the falling film evaporator are arranged with respect to each other such that:
(1) a treated process steam that is generated in the tube side of the falling film evaporator is configured to pass into the counter-current contacting device;
(2) a liquid process stream from the counter-current contacting device is configured to flow into the tube side of the falling film evaporator,
(3) a contaminated steam containing odorants stripped from the liquid process stream the counter-current contacting device is able to pass from the counter-current contacting device to the compressor, wherein the compressor is configured in communication with the shell side of the falling film evaporator, such that the compressed contaminated steam containing odorants from the counter-current contacting device is configured to heat the liquid process stream passing from the counter-current contacting device to the falling film evaporator, the falling film evaporator having provided therein outlets for each of a treated process stream, a condensed contaminated steam and a vent gas in which odorants have been concentrated.

19. The apparatus of claim 18, further comprising:
a recycle line, the recycle line configured to recombine the condensed contaminated steam containing odorants in the falling film evaporator with the contaminated process stream inlet, for reintroduction to the counter-current contacting device.

20. The apparatus of claim 18, further comprising:
a liquid collector and distributor device configured to be attached to a base of the counter-current contacting device, wherein the liquid collector and distributor device is configured to collect condensate the liquid process stream at the base and distribute the liquid process stream substantially uniformly to the tube side of the falling film evaporator.

21. The apparatus of claim 20, further wherein:
the base is configured to facilitate the passage of the treated process steam from the tube side of the falling film evaporator into the counter current contacting device.

22. The apparatus of claim 20, wherein the base is configured such that it is able to collect the liquid process stream at the base and distribute the liquid process stream substantially uniformly to the tube side of the falling film evaporator and facilitate the passage of the flashed vapour from the tube side of the falling film evaporator into the counter current contacting device.

* * * * *

UNITED STATES PATENT AND TRADEMARK OFFICE
CERTIFICATE OF CORRECTION

PATENT NO.        : 9,186,596 B2
APPLICATION NO.   : 13/389718
DATED             : November 17, 2015
INVENTOR(S)       : Peter Stewart Hay Page 1 of 1

It is certified that error appears in the above-identified patent and that said Letters Patent is hereby corrected as shown below:

In the claims

Column 8, line 41, delete "liquid process stream" and insert -- liquid process stream in --

Signed and Sealed this
Fifth Day of July, 2016

Michelle K. Lee
*Director of the United States Patent and Trademark Office*